United States Patent [19]

Paradiso

[11] 3,965,679

[45] June 29, 1976

[54] WAVE ENERGY MACHINE

[76] Inventor: Erasmus J. Paradiso, R.F.D. No. 1, West Edmeston, N.Y. 13485

[22] Filed: June 14, 1974

[21] Appl. No.: 479,545

[52] U.S. Cl. .................................. 60/398; 415/2
[51] Int. Cl.[2] ................................. F16H 41/04
[58] Field of Search ............. 60/398; 417/334–337; 415/2, 7; 290/54

[56] References Cited
UNITED STATES PATENTS

| | | | |
|---|---|---|---|
| 530,118 | 12/1894 | Nichols .............................. | 60/398 |
| 610,790 | 9/1898 | Beckers ........................... | 60/398 X |
| 970,796 | 9/1910 | Clark ................................. | 60/398 |
| 981,077 | 1/1911 | Feldner ............................. | 415/2 |
| 1,517,461 | 12/1924 | Robinson ......................... | 417/334 |
| 3,807,890 | 4/1974 | Wright ............................. | 417/334 X |

FOREIGN PATENTS OR APPLICATIONS

| | | | |
|---|---|---|---|
| 197,031 | 9/1931 | Australia ............................. | 415/2 |
| 593,840 | 9/1925 | France ................................ | 415/2 |
| 223,384 | 10/1924 | United Kingdom ................. | 60/398 |

*Primary Examiner*—Martin P. Schwadron
*Assistant Examiner*—H. Burks, Sr.
*Attorney, Agent, or Firm*—Clarence A. O'Brien; Harvey B. Jacobson

[57] ABSTRACT

A device for utilizing wave energy that is otherwise lost, or spent in eroding shore lines and/or shore facilities, having a combined trough-turbine arrangement is disclosed. Inclined ramp means, curved and triangular deflectors, bucket-wheel combinations, and turbine guards combine with a flywheel to provide smooth-flowing power from wave energy. The interrelationships of the various parts reduces turbulence and increases the thrust of an incoming volume of wave energy, to rotate a shaft from which power can be derived.

5 Claims, 4 Drawing Figures

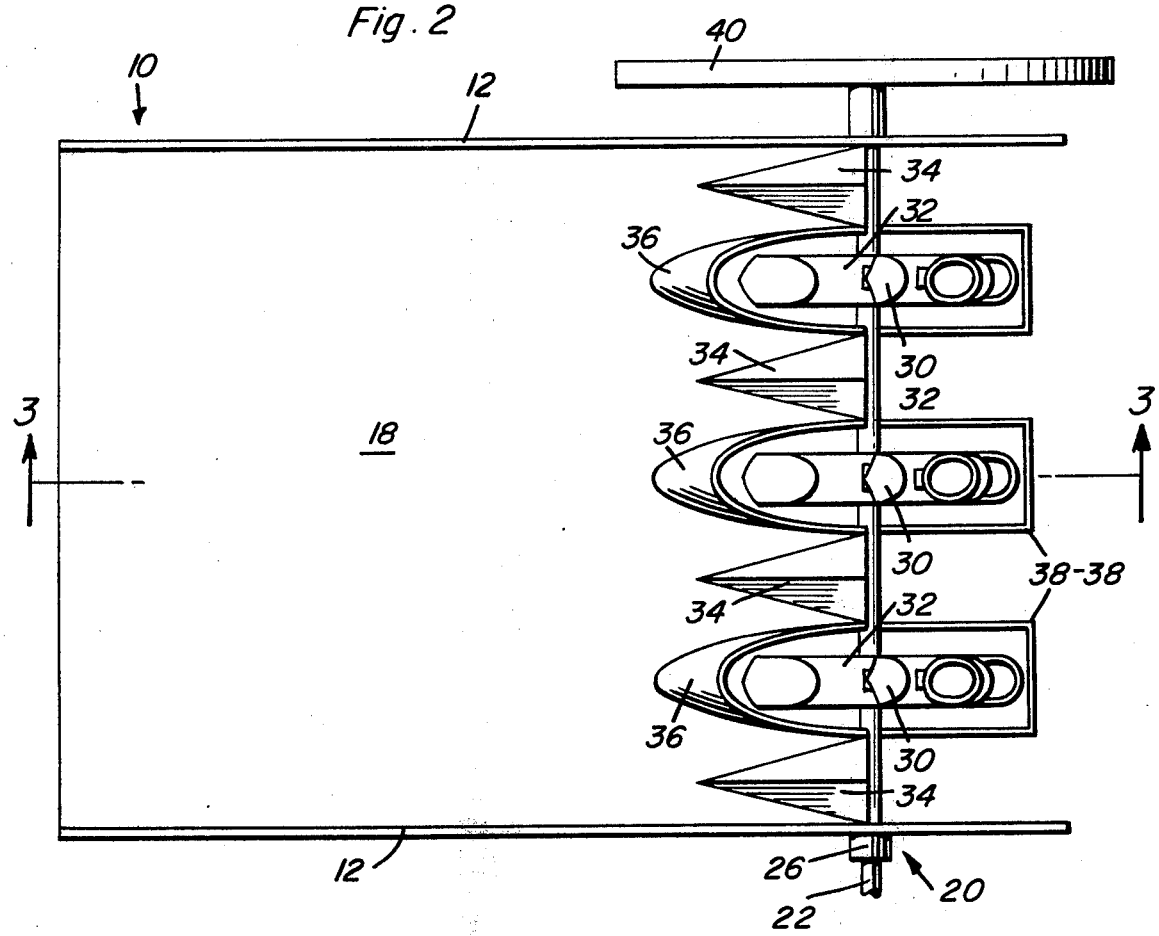
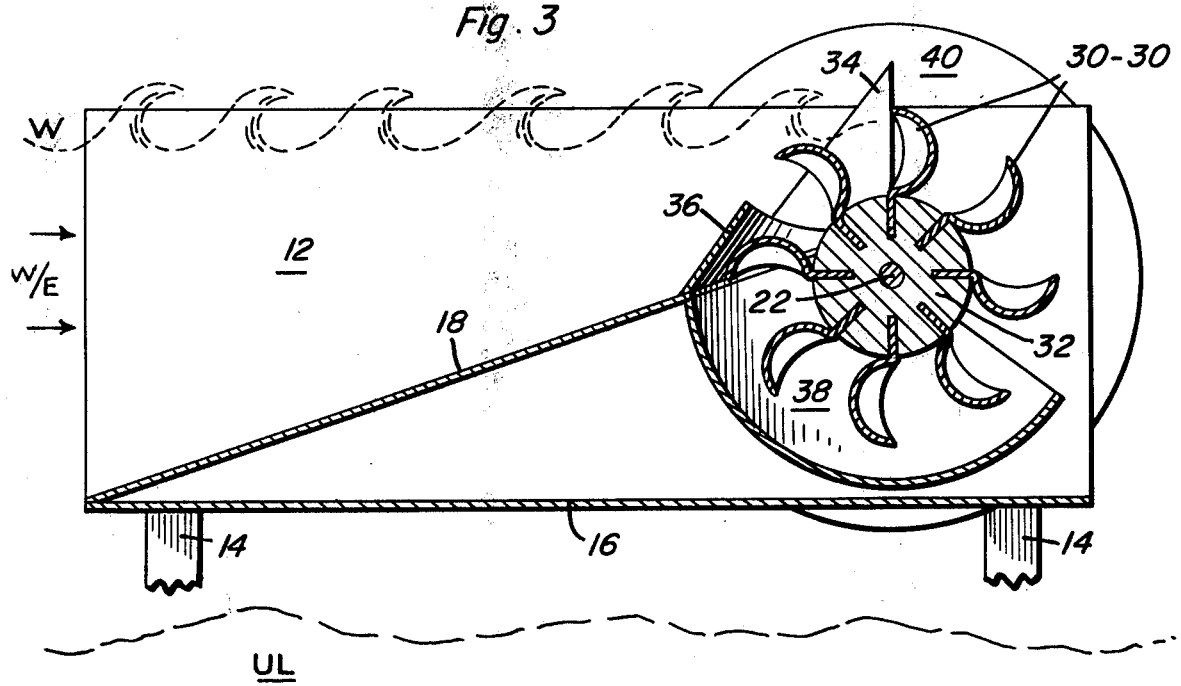

WAVE ENERGY MACHINE

BACKGROUND OF THE INVENTION

The Wilmore patent (U.S. Pat. No. 833,361, issued Oct. 16, 1906) discloses upper waves (A) and undertow or reverse current (B) "simultaneously utilized for propelling the drum (8)". The Messina patent (U.S. Pat. No. 922,935, issueed May 25, 1909) and Taylor patent (U.S. Pat. No. 1,471,222, issued Oct. 16, 1923) each disclose floating devices which also impart rotary motion to develop power. The Clark patent (U.S. Pat. No. 970,796, issued Sept. 20, 1910) discloses spouts discharging water against cup-shaped elements of wheel 8. And, Robertson patent (U.S. Pat. No. 2,342,223, issued Feb. 22, 1944) discloses various adjustable and removable parts for a water power system.

SUMMARY OF THE INVENTION

Among the objects and advantages of my invention are the following:

1. To convert wave energy to useful energy via a combined trough and turbine arrangement.
2. To provide deflectors, buckets, powershaft, flywheel, support and guard means to accomplish the conversion of energy.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a top plan view of the device.

FIG. 3 is a sectional view taken approximately along the line 3—3 of FIG. 2. a

DETAILED DESCRIPTION OF THE INVENTION

Figure 1:
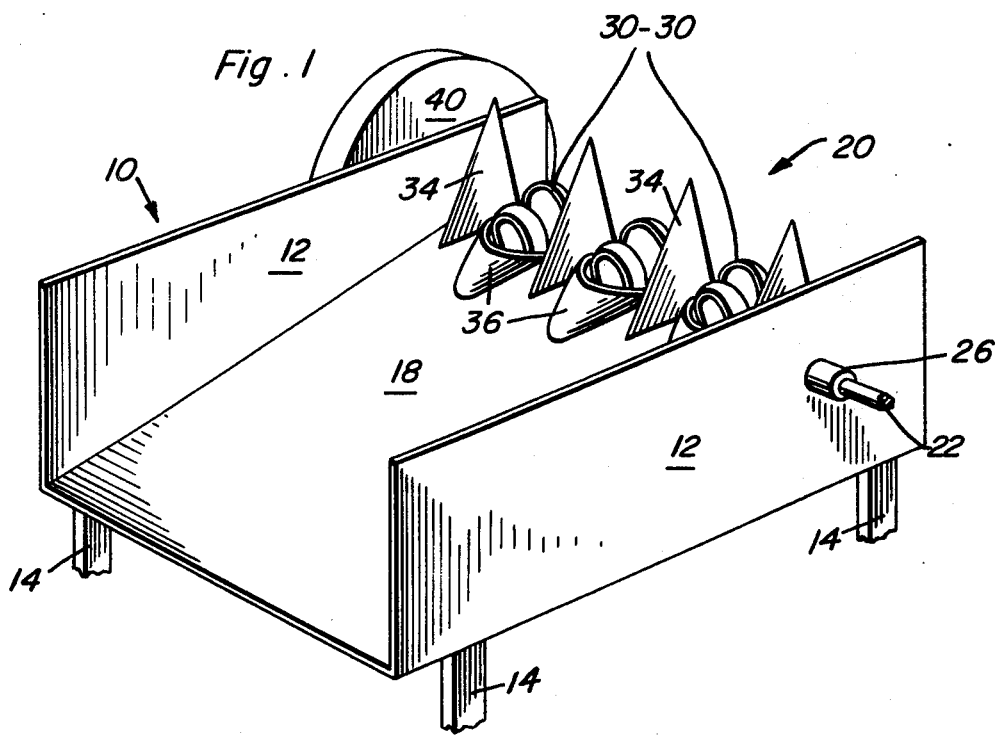
FIG. 1 is a perspective view of the combined trough-turbine arrangement.
Figure 4:
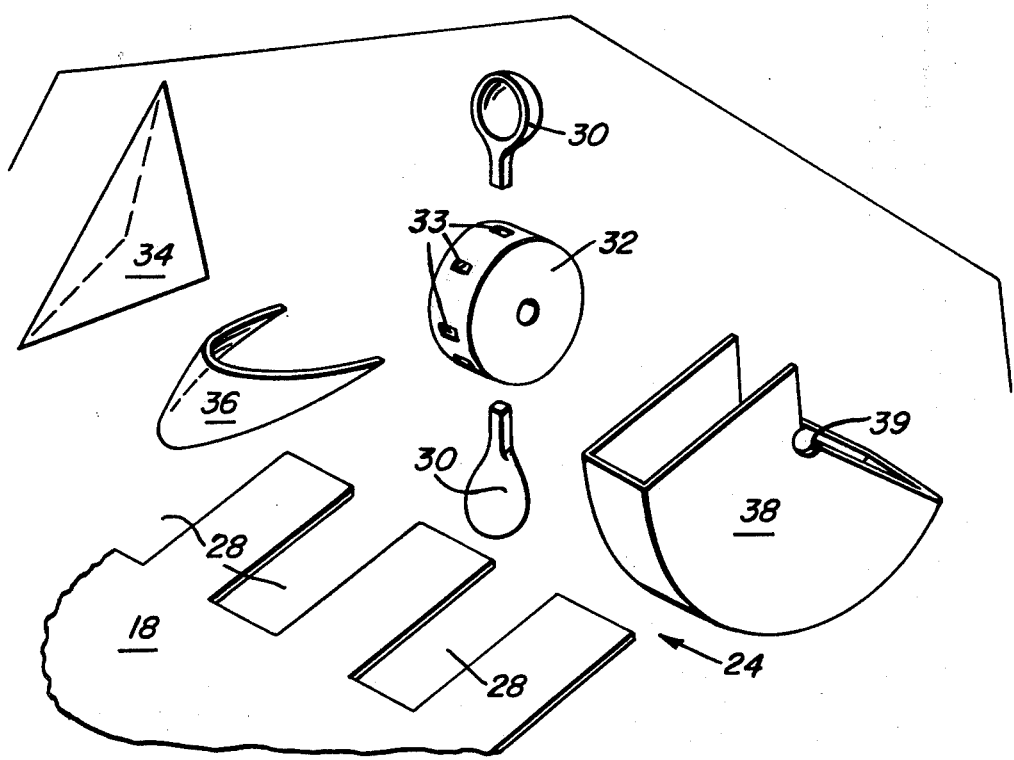
FIG. 4 is an exploded partial perspective view of the structure adjacent one of the bucket-wheel combinations.

In FIGS. 1 through 3, the generally trough-shaped unit 10 has vertically upstanding side walls 12-12, leg means 14-14, a horizontally disposed bottom wall 16, and an inclined ramp 18 leading to the driven shaft area, generally denoted as 20.

The driven shaft 22 extends through each of the side walls 12-12, near the uppermost extent 24 of ramp 18. Suitable bearing or bushing members 26 support the driven shaft 22 in the side walls 12-12. The uppermost edge 24 of ramp 18 is slotted, as at 28-28, to receive buckets 30-30 attached to slotted (at 33) wheels 32-32, which are in turn attached to the driven shaft 22.

Deflectors 34-34, generaly triangularly shaped in outline in each of the views extend from the driven shaft 22, and taper to a point slightly in front of the leftmost extent of the buckets 30-30 (as viewed in FIG. 1) when they extend toward the inclined ramp 18. Curved deflectors 36-36 each in its central and uppermost extent is approximately horizontally aligned with the outermost periphery of its adjacent wheel 32. Turbine guards 38-38, notched at 39 to receive shaft 22, generally surround the open ends of the slots 28-28, buckets 30-30, and wheels 32-32; and, they extend from their points of attachment to ramp 18 to a point near (as viewed in FIG. 3), or touching, bottom wall 16.

A flywheel 40 may be attached to the driven shaft 22, adjacent the exterior of one of the side walls 12-12, as illustrated; or, one or more of such flywheels may be interposed along shaft 22 at desired locations.

FIG. 3 illustrates in dotted lines, waves (W) lapping in the area of the uppermost edges of the side walls 12-12. The dash-dot line running approximately parallel to bottom wall 16, in FIG. 3, denotes the underlying land (UL) upon which legs 14-14, or similar supporting means, rest.

In operation, as the wave energy (see W/E arrows under "W" in FIG. 3) moves from the open sea toward the land, and approaches the combined trough-turbine 10, the force of the moving water (1) up the ramp 18, (2) over the curved deflectors 36, and (3) between the triangular deflectors 34, is concentrated immediately prior to its entry into the buckets 30-30, producing maximum thrust against buckets 30-30 when the uppermost bucket 30 is in its uppermost vertical position. The turbine guards 38-38 prevent undue turbulence in the areas surrounding the bucket-wheel (30-32) combinations. Further, the smooth exterior surfaces of each of the buckets 30-30 reduces turbulence, as each bucket 30 passes through the area encompassed by each turbine guard 38.

With plural units 10 and plural flywheels 40 extending over an appreciable distance, parallel to the shore line, the flywheels will give a smooth output to the turbine, free from jerkiness due to the motion created by the timing of the waves. The above, coupled with the smoothing action of the turbine guards 38 will give a very smooth-running device.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention.

What is claimed as new is as follows:

1. In a wave energy device, the combination of a generally trough-shaped member having upstanding side walls, and an inclined ramp extending longitudinally between the side walls and having a terminal upper edge disposed inwardly of one end of the wall, a driven shaft rotatably mounted in said side walls adjacent the terminal edge of the ramp, a plurality of wheel means mounted on said shaft between said side walls, smoothly-rounded buckets secured on each of said wheel means, the open portions of said buckets when each is in its generally vertically uppermost position facing said inclined ramp, slots in said inclined ramp aligned with and receiving said buckets during rotation of the wheel means, curved deflectors secured to said inclined ramp, in front of each slot, the uppermost edge of each curved deflector extending generally horizontally and slightly above the periphery of said shaft, but below the periphery of each of said wheel means, generally triangularly-shaped deflectors disposed alongside each curved deflector, each secured to said inclined ramp, each extending vertically above the uppermost edges of the buckets, a plurality of turbine guards secured to the underside of said inclined ramp, generally surrounding each of said slots and each of said wheel means and buckets thereon.

2. The device of claim 1 wherein a generally horizontal bottom wall extends below said ramp and between the side walls to a point adjacent said turbine guards.

3. A device for utilizing sea wave energy comprising a generally horizontally disposed, rotatably supported shaft, a plurality of buckets mounted on said shaft in radial relation thereto and in circumferentially spaced relation to each other, each of said buckets including a pocket in one surface thereof with all of the pockets facing in the same circumferential direction, trough means guiding sea waves into impingement with buckets on said shaft disposed above the shaft, and guard means partially enclosing the buckets disposed below the shaft for preventing impingement of sea waves against the buckets below the shaft, the pockets in said buckets above the shaft facing the sea waves for impingement of the sea waves against the pockets for rotating said shaft, said trough means including a ramp having a terminal edge disposed adjacent the shaft and including a slot receiving said buckets, a deflector on the upper surface of the ramp partially encircling the slot and terminating below the upper edges of the buckets extending upwardly from the shaft for guiding sea waves into engagement with those buckets which are at an angular position so that the outer end thereof is substantially above the terminal edge of the ramp.

4. The structure as defined in claim 3 wherein said guard means includes a downwardly curved shield connected to the undersurface of the ramp in partially encircling relation to the slot and extending downwardly and in a curved manner below the buckets disposed below the shaft to prevent impingement of sea waves against those buckets below the shaft which are moving in an angular direction toward the ramp.

5. The structure as defined in claim 4 wherein said ramp is longitudinally elongated and extends transversely between two upstanding side walls, said shaft extending between said side walls and having a plurality of longitudinally spaced sets of buckets thereon with the ramp having a corresponding number of slots, deflectors and shields thereon, and a plurality of upwardly extending, generally triangular shaped deflectors terminating at the terminal edge of the ramp and adjacent the side extremities of the buckets disposed above the shaft and in spaced relation to the deflectors encircling the slots for deflecting water from the sea waves into the buckets from the side edges thereof as the buckets pass a vertical position.

* * * * *